(12) United States Patent
Shazeer et al.

(10) Patent No.: US 10,685,012 B2
(45) Date of Patent: Jun. 16, 2020

(54) GENERATING FEATURE EMBEDDINGS FROM A CO-OCCURRENCE MATRIX

(71) Applicant: Google LLC, Mountain View, CA (US)

(72) Inventors: Noam M. Shazeer, Palo Alto, CA (US); Colin Hearne Evans, San Mateo, CA (US); Christopher Robert Waterson, Incline Village, NV (US); Ryan P. Doherty, San Jose, CA (US)

(73) Assignee: Google LLC, Mountain View, CA (US)

( * ) Notice: Subject to any disclaimer, the term of this patent is extended or adjusted under 35 U.S.C. 154(b) by 556 days.

(21) Appl. No.: 15/424,671

(22) Filed: Feb. 3, 2017

(65) Prior Publication Data

US 2017/0228414 A1 Aug. 10, 2017

Related U.S. Application Data

(60) Provisional application No. 62/291,956, filed on Feb. 5, 2016.

(51) Int. Cl.
*G06F 16/23* (2019.01)
*G06F 16/31* (2019.01)
(Continued)

(52) U.S. Cl.
CPC ........ *G06F 16/2365* (2019.01); *G06F 16/316* (2019.01); *G06F 16/332* (2019.01);
(Continued)

(58) Field of Classification Search
CPC .............................. G06F 17/28; G06F 16/2365
See application file for complete search history.

(56) References Cited

U.S. PATENT DOCUMENTS

2011/0264640 A1* 10/2011 Fontoura ............ G06Q 30/0241
707/706
2013/0103402 A1* 4/2013 Chopra .................. G10L 15/02
704/240

(Continued)

OTHER PUBLICATIONS

Agirre et al. "A study on similarity and relatedness using distributional and wordnet-based approaches," Proceedings of Human Language Technologies: The 2009 Annual Conference of the North American Chapter of the Association for Computational Linguistics, May 31, 2009, 9 pages.

(Continued)

*Primary Examiner* — Mariela Reyes
*Assistant Examiner* — Courtney Harmon
(74) *Attorney, Agent, or Firm* — Fish & Richardson P.C.

(57) ABSTRACT

Methods, and systems, including computer programs encoded on computer storage media for generating compressed representations from a co-occurrence matrix. A method includes obtaining a set of sub matrices of a co-occurrence matrix, where each row of the co-occurrence matrix corresponds to a feature from a first feature vocabulary and each column of the co-occurrence matrix corresponds to a feature from a second feature vocabulary; selecting a sub matrix, wherein the sub matrix is associated with a particular row block and column block of the co-occurrence matrix; assigning respective d-dimensional initial row and column embedding vectors to each row and column from the particular row and column blocks, respectively; and determining a final row embedding vector and a final column embedding vector by iteratively adjusting the initial row embedding vectors and the initial column embedding vectors using the co-occurrence matrix.

20 Claims, 4 Drawing Sheets

(51) Int. Cl.
*G06F 16/332* (2019.01)
*G06F 16/33* (2019.01)
*G06K 9/62* (2006.01)
*G06F 40/44* (2020.01)
*G06F 17/16* (2006.01)
*G06N 5/04* (2006.01)

(52) U.S. Cl.
CPC .......... *G06F 16/3344* (2019.01); *G06F 17/16* (2013.01); *G06F 40/44* (2020.01); *G06K 9/6243* (2013.01); *G06N 5/04* (2013.01)

(56) References Cited

U.S. PATENT DOCUMENTS

| | | | | |
|---|---|---|---|---|
| 2013/0191425 | A1* | 7/2013 | Porikli | G06K 9/6249 708/207 |
| 2013/0204885 | A1* | 8/2013 | Clinchant | G06K 9/4676 707/756 |
| 2015/0178378 | A1* | 6/2015 | Hellstrom | G06Q 10/10 706/14 |
| 2015/0248476 | A1* | 9/2015 | Weissinger | G06F 16/35 707/737 |
| 2017/0171151 | A1* | 6/2017 | Raemy | G06Q 30/02 |

OTHER PUBLICATIONS

Baroni et al. "Don't count, predict! A systematic comparison of context-counting vs. context-predicting semantic vectors," Proceedings of the 52$^{nd}$ Annual Meeting of the Association for Computational Linguistics, vol. 1, Jun. 22, 2014, 10 pages.

Bruni et al. "Distributional semantics in technicolor," Proceedings of the 50$^{th}$ Annual Meeting of the Association for Computational Llinguistics: Long Papers, vol. 1, Jul. 8, 2012, 10 pages.

Dean et al. "Large scale distributed deep networks," Advances in Neural Information Processing Systems, 2012, 9 pages.

Duchi et al. "Adaptive subgradient methods for online learning and stochastic optimization," Journal of Machine Learning Research, Jul. 2011, 39 pages.

Finkelstein, et al. "Placing search in context: The concept revisited," Proceedings of the 10$^{th}$ international conference on World Wide Web, Apr. 1, 2001, 16 pages.

Hill et al. "Simlex-999: Evaluating semantic models with (genuine) similarity estimation," Association for Computational linguistics, vol. 41, No. 4. Dec. 2015, 31 pages.

Hu et al. "Collaborative filtering for implicit feedback datasets," 8$^{th}$ IEEE International Conference on Data Mining, Dec. 15, 2008, 10 pages.

International Search Report and Written Opinion in International Application No. PCT/US2017/016431, dated May 9, 2017, 14 pages.

Levy et al. "Improving distributional similarity with lessons learned from word embeddings," Transactions of the Association for Computational Linguistics, May 4, 2015, 16 pages.

Levy et al. "Neural word embedding as implicit matrix factorization," Advances in Neural Information Processing Systems, 2014, 9 pages.

Li et al. "Word Embedding Revisited: A New representation Learning and Explicit Matrix Factorization Perspective," Proceedings of the 24$^{th}$ International joint Conference on Artificial Intelligence, Jul. 25, 2015, 7 pages.

Luong et al. "Better word representations with recursive neural networks for morphology," CoNLL-2013, Aug. 8, 2013, 10 pages.

Mikolov et al. "Efficient estimation of word representation in vector space," arXiv preprint arXiv 1301.3781v3 Sep. 7, 2013, 12 pages.

Mikolov et al. "Linguistic regularities in continuous space word representations," HLT-NAACL, Jun. 9, 2013, 6 pages.

Pennington et al. "GloVe: Global vectors for word representation," Proceedings of the Empirical methods in Natural Language Processing, vol. 14, Oct. 25, 2014, 12 pages.

Radinsky et al. "A word at a time: computing word relatedness using temporal semantic analysis," Proceedings of the 20$^{th}$ international conference on World wide web, Mar. 28, 2011, 10 pages.

Shazeer et al. "Swivel: Improving embeddings by noticing what's missing," arXiv preprint arXiv1602.02215v1, Feb. 6, 2016, 9 pages.

Zesch et al. "Using Wiktionary for computing semantic relatedness," AAAI, vol. 8, Jul. 13, 2008, 6 pages.

\* cited by examiner

GENERATING FEATURE EMBEDDINGS FROM A CO-OCCURRENCE MATRIX

CROSS-REFERENCE TO RELATED APPLICATION

This application claims priority to U.S. Provisional Application No. 62/291,956, filed on Feb. 5, 2016. The disclosure of the prior application is considered part of and is incorporated by reference in the disclosure of this application.

BACKGROUND

This specification relates to generating feature embeddings from a co-occurrence matrix.

In order to create word embeddings, systems attempt to compress the distributional structure of raw language co-occurrence statistics to generate compact representations that retain properties of the original space. For example, systems may implement matrix factorization models or sample from a sliding window. The created word embeddings can be used in natural language tasks such as determining semantic similarity, parsing and translation.

SUMMARY

This specification describes methods and systems, including computer programs encoded on computer storage media, for generating feature embeddings from a co-occurrence matrix.

In general, one innovative aspect of the subject matter described in this specification can be embodied in methods for obtaining a set of sub matrices of a feature co-occurrence matrix, wherein each row of the feature co-occurrence matrix corresponds to a feature from a first feature vocabulary and each column of the feature co-occurrence matrix corresponds to a feature from a second feature vocabulary; selecting a sub matrix from the set of sub matrices, wherein the sub matrix is associated with a particular row block of the feature co-occurrence matrix and a particular column block of the feature co-occurrence matrix; assigning a respective d-dimensional initial row embedding vector to each row from the particular row block and a respective d-dimensional initial column embedding vector to each column from the particular column block, wherein d represents a predetermined target dimensionality; and determining a final row embedding vector for each row from the particular row block and a final column embedding vector for each column from the particular column block by iteratively adjusting the initial row embedding vectors from the particular row block and the initial column embedding vectors from the particular column block using the feature co-occurrence matrix.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations determining a final row embedding vector for each row from the particular row block and a final column embedding vector for each column from the particular column block by iteratively adjusting the initial row embedding vectors from the particular row block and the initial column embedding vectors from the particular column block using the feature co-occurrence matrix is performed in parallel for multiple sub matrices in the set of sub matrices.

In some implementations selecting a sub matrix from the set of sub matrices comprises selecting a sub matrix from the set of sub matrices at random.

In some implementations each d-dimensional initial row embedding vector and each d-dimensional initial column embedding vector have values that are distributed according to a normal distribution with zero mean and $d^{-1/2}$ variance.

In some implementations iteratively adjusting the initial row embedding vectors from the particular row block and the initial column embedding vectors from the particular column block using the co-occurrence matrix comprises, for each iteration: computing a matrix product of the row embedding vectors from the particular row block and column embedding vectors from the particular column block to generate a predicted point-wise mutual information (PMI) value for the selected sub matrix; comparing the generated predicted PMI value for the selected sub matrix to an observed PMI value for the selected sub matrix to determine an error; determining adjustments for the row embedding vectors from the particular row block and column embedding vectors from the particular column block based on the determined error; and adjusting the row embedding vectors from the particular row block and column embedding vectors from the particular column block using the determined adjustments.

In some implementations determining adjustments for the row embedding vectors from the particular row block and column embedding vectors from the particular column block based on the determined error comprises performing stochastic gradient descent.

In some implementations the observed PMI value is calculated based on a respective i-jth entry of the feature co-occurrence matrix and respective marginal counts of each row feature and each column feature of the feature co-occurrence matrix.

In some implementations iteratively adjusting the row embedding vectors from the particular row block and the column embedding vectors from the particular column block using the co-occurrence matrix is performed until a determined decrease between consecutive determined errors is below a predetermined threshold.

In some implementations the method further comprises constructing the set of sub matrices of the feature co-occurrence matrix, comprising: obtaining a corpus of text; computing an initial m×n feature co-occurrence matrix over the corpus of text, wherein the initial feature co-occurrence matrix includes m row features and n column features; sorting the m rows into descending order of feature frequency and generating m/k row blocks by collecting the m sorted rows into k-element row blocks, wherein k is chosen based on the target dimensionality d and a desired computational efficiency; sorting the n columns into descending order of feature frequency and generating n/k column blocks by collecting the n sorted columns into k-element row blocks; and constructing a set of $mn/k^2$ sub matrices of the m×n feature co-occurrence matrix, comprising, for each row block and column block pair, constructing a k×k sub matrix from the m×n feature co-occurrence matrix by selecting appropriate entries of the m×n feature co-occurrence matrix.

In some implementations an i-jth entry of the initial m×n feature co-occurrence matrix represents an observed co-occurrence count of row feature i with column feature j, and each i-jth entry of the initial m×n feature co-occurrence matrix take a value that is greater than or equal to zero.

In some implementations the value of an i-jth entry of the initial m×n feature co-occurrence matrix is greater than zero and comparing the generated predicted PMI value for the selected sub matrix to an observed PMI value for the selected sub matrix to determine an error comprises computing a weighted squared error between the predicted PMI value and the observed PMI value of feature i and feature j.

In some implementations the computed weighted squared error is modulated by a confidence function, wherein the confidence function increases or decreases the computed error dependent on a confidence of the i-jth entry of the initial m×n feature co-occurrence matrix.

In some implementations the confidence function is a linear transformation of the i-jth entry of the initial m×n feature co-occurrence matrix.

In some implementations the i-jth entry of the initial m×n feature co-occurrence matrix equals zero and comparing the generated predicted PMI value for the selected sub matrix to an observed PMI value for the selected sub matrix to determine an error comprises applying a soft hinge error to the predicted PMI value.

In some implementations the method further comprises computing a hallucinated PMI by setting the i-jth entry of the initial m×n feature co-occurrence matrix to 1 and using asymmetric cost function that penalizes over-estimation of the hallucinated PMI.

In some implementations elements of the m/k row blocks are generated by choosing rows that are congruent mod m/k, and elements of the n/k column blocks are generated by choosing columns that are congruent mod m/k.

In some implementations the features from the first and second feature vocabulary comprise words or strings of words from a particular language.

In some implementations the first feature vocabulary is different to the second feature vocabulary that is used for the column features.

The subject matter described in this specification can be implemented in particular embodiments so as to realize one or more of the following advantages.

A system for generating feature embeddings from a feature co-occurrence matrix, as described in this specification, may be used to generate low dimensional feature embeddings that more accurately represent an original feature space compared to feature embeddings generated by other feature embedding systems. For example, other feature embedding systems typically generate feature embeddings based on observed co-occurrences between features. However, a system for generating feature embeddings from a feature co-occurrence matrix, as described in this specification, generates feature embeddings based on both observed co-occurrences and unobserved co-occurrences. This enables the system to identify anti-associations between features—increasing the amount of relevant information used to generate the feature embeddings and thus improving the accuracy and completeness of the generated feature embeddings.

A system for generating feature embeddings from a feature co-occurrence matrix, as described in this specification, may be computationally more efficient compared to other feature embedding systems. For example, the system described in this specification may require less computational time to generate feature embeddings of comparable, if not better, accuracy compared to other feature embedding systems. For example, the system described in this specification may perform full matrix multiplications between thousands of row and column embeddings at once, simultaneously producing predictions for millions of individual point-wise mutual information values. This may allow the system to fully utilize the computational power of modern GPU and vectorized CPU hardware.

In addition, in order to achieve greater computational efficiency, the system described in this specification may be configured to apply a method whereby an original feature co-occurrence matrix (which may contain millions of rows and millions of columns) is separated into smaller submatrices that may be sized for optimal computation on a single compute node (typically thousands of rows and thousands of columns). This allows the computation for generating the feature embeddings to be distributed across a cluster of computers, resulting in an efficient way to learn embeddings over all the values in the feature co-occurrence matrix.

A system for generating feature embeddings from a feature co-occurrence matrix, as described in this specification, is agnostic to both the domain from which the features are drawn, and to the exact set of features that are used. Furthermore, a feature vocabulary used for the rows of the co-occurrence matrix need not be the same as that which is used for the columns of the co-occurrence matrix.

Unlike other systems for generating feature embeddings, the computational requirements of the system described in this specification are dependent on the size of the feature co-occurrence matrix used to generate the feature embeddings, and not the size of the set of features from which the features are sampled from. This means that the systems and methods described in this specification may be applied to much larger corpora than other systems and methods, resulting in higher-quality word embeddings.

A system for generating feature embeddings from a feature co-occurrence matrix, as described in this specification, provides an improvement in the scale at which other systems for generating feature embeddings operate at. For example, the system described in this specification is able to consider very detailed features that individually occur very rarely (e.g., for language models: 4- and 5-grams, syntactic paths) and therefore require massive amounts of textual data from which to gather accurate statistics. In addition, the systems and methods described in this specification are able to efficiently generate and apply feature embedding models that contain tens of millions of features.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for generating low dimensional feature embeddings from a feature co-occurrence matrix.

Example features include words from a particular language, strings of words from a particular language, or syntactic paths between words. For example, the methods and systems may be used to generate (or "train") low dimensional vector representations of words which may in turn be used to perform natural language processing tasks, including determining semantic similarity, parsing or translation. Co-occurrences of such features may include how many times a word or string of words appear directly next to another word or string of words, how many times a word occurs in a particular syntactic role, or how many times a word or string of words occurs in a particular syntactic role.

Further example features may be taken from domains other than words or languages. For example, the features may include a set of videos, a set of products or a set of people. Co-occurrences of such features may include how many times different people have watched different videos or how many times different people have bought different products.

Generally, feature co-occurrences may be represented by a feature co-occurrence matrix. The feature co-occurrence matrix is a matrix whose entries represent statistics describing how features from one or more feature vocabularies occur together. For example, for a text corpus including the sentences "curiosity killed the cat" and "the cat sat on the mat," a feature co-occurrence matrix may be used to represent statistics describing how words in the text corpus occur together. For example, the feature co-occurrence matrix for the words "the" and "cat" may be given by the below matrix

|     | The | cat | sat | on | mat | curiosity | killed |
| --- | --- | --- | --- | --- | --- | --- | --- |
| the | 0 | 2 | 0 | 0 | 1 | 0 | 0 |
| cat | 0 | 0 | 1 | 0 | 0 | 0 | 0 |

The example feature co-occurrence matrix shows that the word "cat" follows the word "the" twice in the text corpus, that "sat" follows "cat" once, and that "mat" follows "the" once. Feature matrices for large text corpuses can be very large, e.g., with millions of entries.

Figure 1:
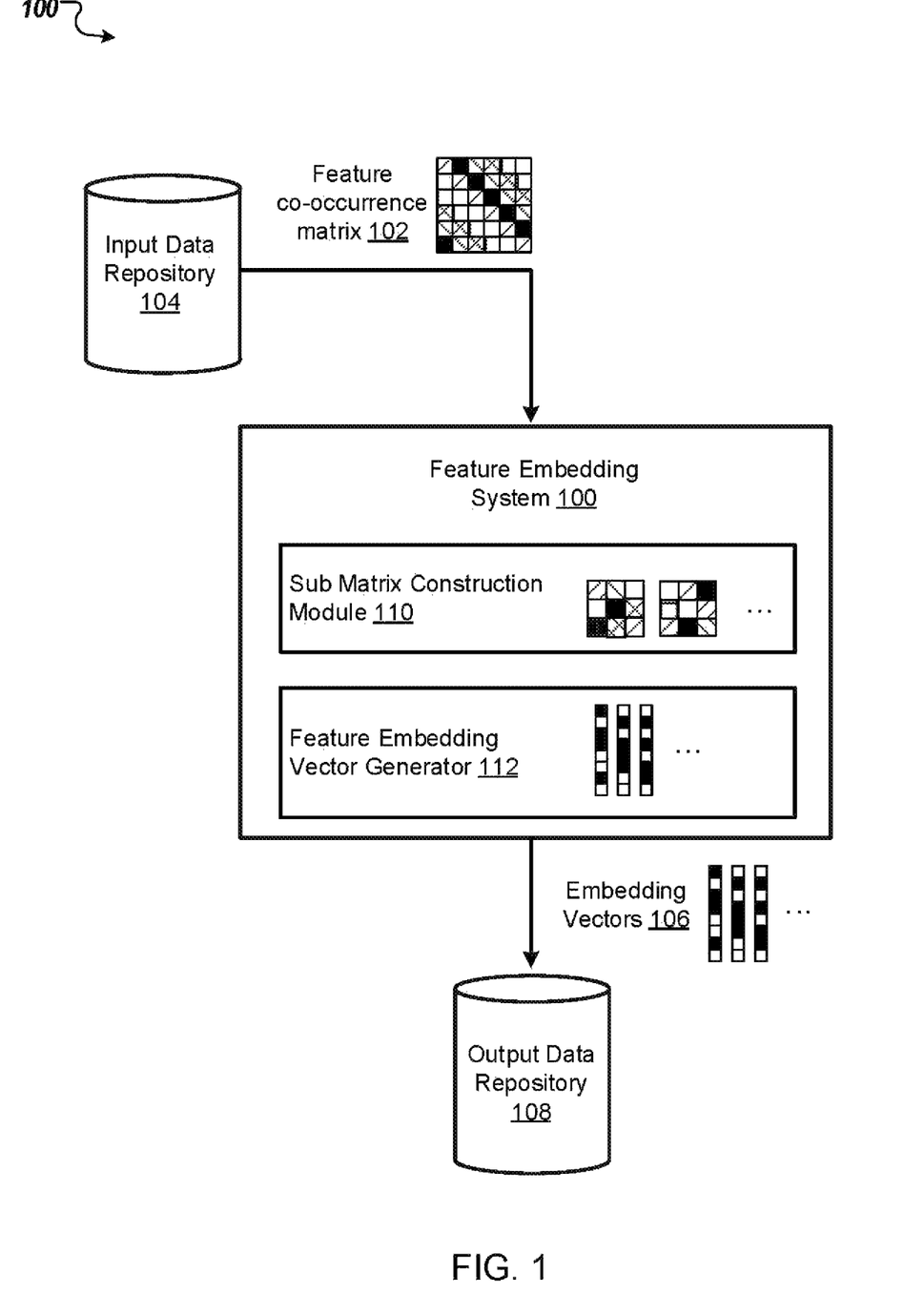
FIG. 1 shows an example feature embedding system.

FIG. 1 shows an example feature embedding system 100. The feature embedding system 100 is an example of a system implemented as computer programs on one or more computers in one or more locations, in which the systems, components, and techniques described below can be implemented.

The feature embedding system 100 is a system that receives input data representing a feature co-occurrence matrix, e.g., feature co-occurrence matrix 102. The feature co-occurrence matrix is a matrix whose entries represent statistics describing how features from one or more feature vocabularies occur together. For example, each row of the feature co-occurrence matrix 102 may correspond to a feature from a first feature vocabulary and each column of the feature co-occurrence matrix 102 may correspond to a feature from a second feature vocabulary. The first feature vocabulary may be different to the second feature vocabulary. In some implementations, the received input data may include high dimensional data, e.g., a feature co-occurrence matrix with millions of entries.

Features in the feature vocabularies may be stored in an input data repository, e.g., input data repository 104. As example, the input data repository 104 may include a corpus of text. In this example, the feature vocabularies may include a vocabulary of words from a particular language, a vocabulary of strings of words from a particular language, or a vocabulary of syntactic paths between words that appear in the corpus of text.

The feature embedding system 100 generates output data representing feature embedding vectors, e.g., embedding vectors 106. The generated feature embedding vectors 106 may include low dimensional feature embedding vectors, i.e., compact feature representations that retain properties of the original feature space represented by the feature co-occurrence matrix 102. Continuing the example above, a text corpus including the sentences "curiosity killed the cat" and "the cat sat on the mat" may be a text corpus of English words and sentences, e.g., taken from a book or other resource. The text corpus may therefore include a feature vocabulary of millions of different words, where each word is represented by a feature vector whose dimension is dependent on the size of the feature vocabulary, e.g., a feature vector with millions of entries. In this example, the feature embedding system 100 may be configured to generate output data representing feature embedding vectors whose dimensions are lower than the dimension of the feature vocabulary, e.g., feature vectors with hundreds rather than millions of entries.

The feature embedding system 100 may be configured to store the generated low dimensional feature embedding vectors 106, e.g., in output data repository 108, or to provide the low dimensional feature embedding vectors for use for some other immediate purpose. For example, the generated low dimensional feature embedding vectors 108 may be stored and/or provided for use in a natural language processing system, image classification system, or other machine learning model. Generally, feature embeddings may be used as a basis for machine learning models. In examples where the features represented by the generated feature embedding vectors are words, the feature embedding vectors may capture basic linguistic features that can be leveraged by machine learning models. Because the generated feature embedding vectors are low dimensional, building machine learning models using the generated feature embedding vectors may be easier compared to building machine learning model using higher dimensional feature embedding vectors. In text domains, feature embeddings may be used to analyze text sentiment, queries with similar intents, words with similar meanings, words in different languages with similar meanings, etc. In other domains, feature embeddings may be used to identify users with similar preferences, similar products, similar artists, movies, songs, etc.

The feature embedding system 100 is configured to obtain a set of sub matrices of the feature co-occurrence matrix 102, where each sub matrix is associated with a particular row block of the feature co-occurrence matrix 102 and a particular column block of the feature co-occurrence matrix 102. Optionally, the feature embedding system 100 may include a sub matrix construction module, e.g., sub matrix construction module 110, that is configured to construct the set of sub matrices of the feature co-occurrence matrix 102.

Constructing a set of sub matrices from a feature co-occurrence matrix is described in detail with reference to FIG. 3 below.

The feature embedding system 100 includes a component for generating feature embedding vectors, e.g., feature embedding vector generator 112. The feature embedding vector generator 112 is configured to select a sub matrix from the set of sub matrices, and to assign a respective d-dimensional initial row embedding vector to each row from the particular row block and a respective d-dimensional initial column embedding vector to each column from the particular column block, where d represents a predetermined target dimensionality.

The feature embedding vector generator 112 is further configured to determine a final row embedding vector for each row from the particular row block and a final column embedding vector for each column from the particular column block by iteratively adjusting the initial row embedding vectors from the particular row block and the initial column embedding vectors from the particular column block using the feature co-occurrence matrix 102. The final row embedding vectors and final column embedding vectors may be combined to produce the embedding vector output 106. Generating feature embedding vectors 106 from a feature co-occurrence matrix 102 is described in more detail below with reference to FIGS. 2 and 4.

Figure 2:
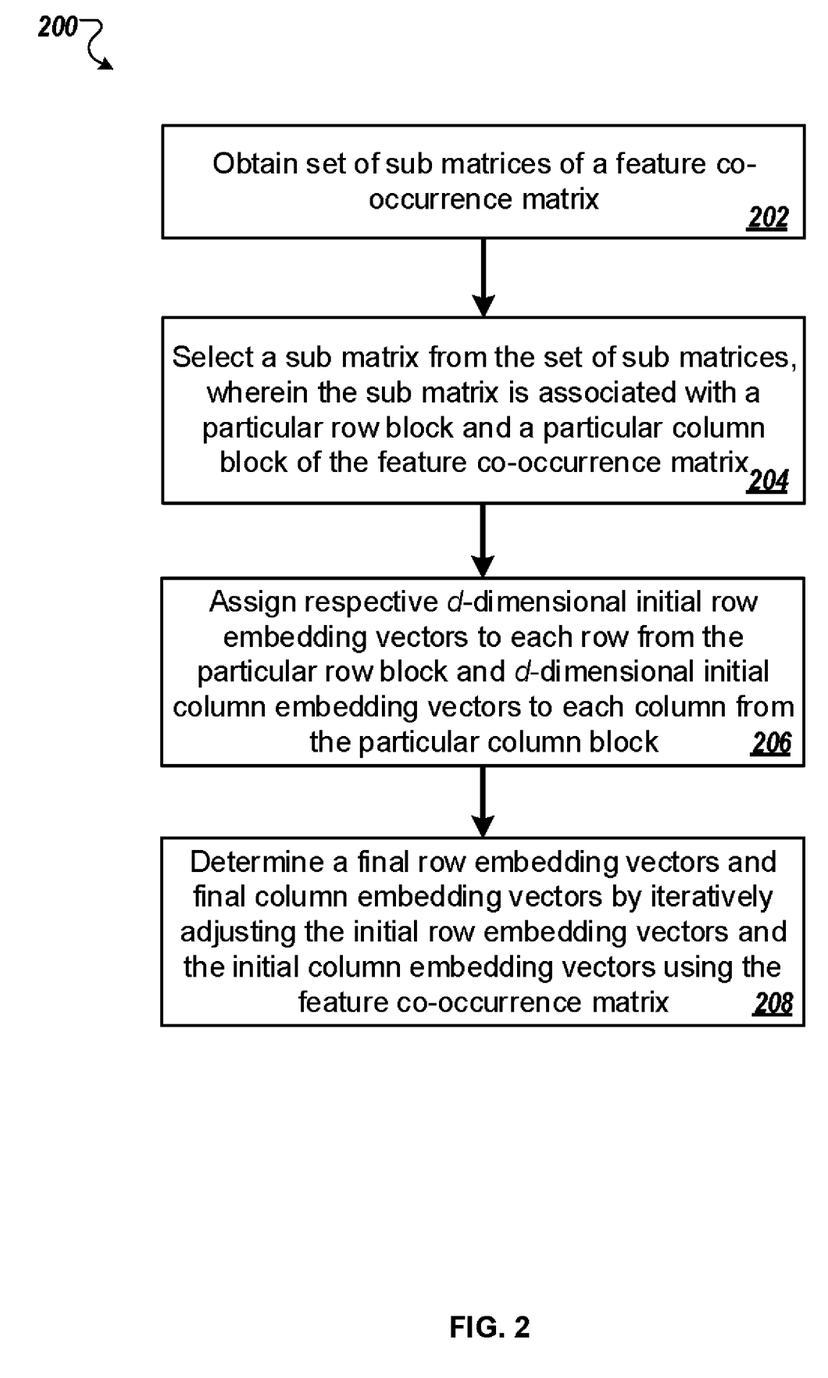
FIG. 2 is a flow diagram of an example process for generating feature embeddings from a feature co-occurrence matrix.

FIG. 2 is a flow diagram of an example process for generating feature embeddings from a co-occurrence matrix. For convenience, the process 200 will be described as being performed by a system of one or more computers located in one or more locations. For example, a system configured to feature embedding, e.g., the feature embedding system 100 of FIG. 1, appropriately programmed in accordance with this specification, can perform the process 200.

The system obtains a set of sub matrices of a feature co-occurrence matrix (step 202). The feature co-occurrence matrix is a matrix whose entries represent statistics describing how features from one or more feature vocabularies occur together at given offsets. For example, an ij-th entry of the feature co-occurrence matrix may represent an observed co-occurrence count of a matrix row feature i with a matrix column feature j.

Example features include words from a particular language, e.g., a set of English words, strings of words from a particular language, e.g., the string "United States of America", or syntactic paths between words. The feature co-occurrence matrix may then indicate how many times a word or string of words appear directly next to another word or string of words, how many times a word occurs in a particular syntactic role, or how many times a word or string of words occurs in a particular syntactic role.

Further example features may be taken from domains other than words or languages. For example, the features may include a set of videos and a set of people, the set of videos and set of videos constituting respective feature vocabularies. In this example, the feature co-occurrence matrix may indicate how many times different people watch different videos, e.g., how often a person who watched a first video also watched a second video. As another example, the features may include a set of products, the set of products constituting a respective feature vocabulary. In this example, the feature co-occurrence matrix may indicate how many times different people bought different products, e.g., how often a person who bought a first product also bought a second product.

Generally, the feature co-occurrence matrix may be a m×n matrix where each row of the feature co-occurrence matrix corresponds to a feature from a first feature vocabulary and each column of the feature co-occurrence matrix corresponds to a feature from a second feature vocabulary. In some implementations the first feature vocabulary may be different to the second feature vocabulary, e.g., in cases where the feature co-occurrence matrix is used to indicate how often some words appear directly next to certain phrases, or how often some people watch certain videos.

The number of sub matrices in the set of sub matrices and the size of the sub matrices in the set of sub matrices is dependent on the size of the feature co-occurrence matrix, e.g., on m and n, and on a predetermined target dimensionality of the row and column embedding vectors. In some implementations, the system may be configured to construct the set of sub matrices, e.g., using a sub matrix construction module as described in FIG. 1. Constructing a set of sub matrices of a feature co-occurrence matrix is described in more detail below with reference to FIG. 3.

The system selects a sub matrix from the set of sub matrices (step 204). The sub matrix is a matrix that is associated with a particular row block of the feature co-occurrence matrix and a particular column block of the feature co-occurrence matrix. For example, a 2×2 sub matrix selected from the top left hand corner of a m×n feature co-occurrence matrix may be associated with a row block that includes the first two rows of the feature co-occurrence matrix, and the first two columns of the feature co-occurrence matrix. In some implementations the system may select the sub matrix from the set of sub matrices at random, e.g., according to a uniform distribution.

The system assigns a respective d-dimensional initial row embedding vector to each row from the particular row block and a respective d-dimensional initial column embedding vector to each column from the particular column block (step 206). In some implementations d is a predetermined target dimensionality. Generally, low values of the d-dimensional initial row embedding vectors and initial column embedding vectors may result in compact but noisy feature embedding vectors. High values of the d-dimensional initial row embedding vectors and initial column embedding vectors may result in less compact but more granular feature embedding vectors. The predetermined target dimensionality may therefore be selected based on a variety of factors including, but not limited to, the size of the feature co-occurrence matrix, the type of features represented by the feature co-occurrence matrix, computational hardware used to perform the process 200 or a setting in which generated feature embedding vectors are to be used, as described above with reference to FIG. 1. In some implementations each d-dimensional initial row embedding vector and each d-dimensional initial column embedding vector have values that are distributed according to a normal distribution with zero mean and $d^{-1/2}$ variance.

The system determines a final row embedding vector for each row from the particular row block and a final column embedding vector for each column from the particular column block using the feature co-occurrence matrix (step 208). The final row and column embedding vectors may include low dimensional feature embedding vectors for the feature co-occurrence matrix.

The system determines the final row embedding vectors from the particular row block and final column embedding vectors from the particular column block by iteratively adjusting the initial row embedding vectors and the initial column embedding vectors using the feature co-occurrence matrix. In some implementations, this may include iteratively adjusting the initial row embedding vectors and the initial column embedding vectors using the feature co-occurrence matrix until a determined decrease between consecutively determined errors is below a predetermined threshold. An example iteration of adjusting the initial row embedding vectors and the initial column embedding vectors using the feature co-occurrence matrix is described below with reference to FIG. 4.

In some implementations, the system may determine a final row embedding vector for each row from the particular row block and a final column embedding vector for each column from the particular column block by iteratively adjusting the initial row embedding vectors from the particular row block and the initial column embedding vectors from the particular column block using the feature co-occurrence matrix for multiple sub matrices in the set of sub matrices in parallel. For example, the system may perform the above described steps 204-208 for multiple sub matrices of the feature co-occurrence matrix in parallel.

The determined final row embedding vectors and final column embedding vectors may be provided for use in conjunction with systems for generating and processing feature embeddings, e.g., natural language processing systems. For example, generated word or phrase embeddings may be used to represent corresponding words or phrases in a machine learning system for determining semantic similarity, parsing or translation.

In cases where row and column features are drawn from a same vocabulary, the system may select a set of final embedding vectors by selecting only the row embedding vectors and discarding the column embedding vectors, or vice versa. Alternatively, the system may concatenate the row and column embedding vectors for corresponding terms to obtain embedding vectors with 2*d numeric values for each entry. Alternatively, the system may average the row and column embeddings element-wise for corresponding entries.

Figure 3:
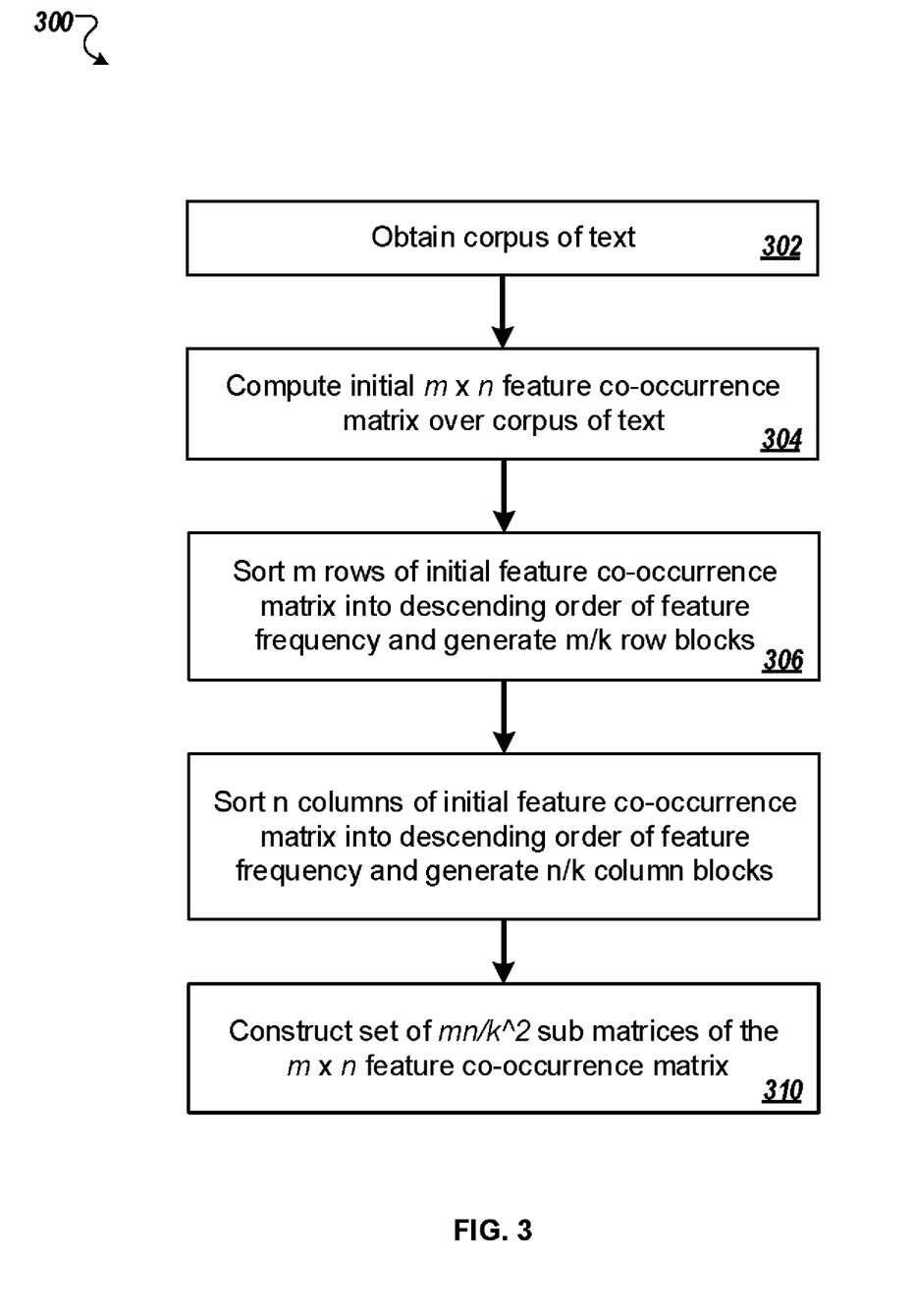
FIG. 3 is a flow diagram of an example process for constructing a set of sub matrices of a feature co-occurrence matrix.

FIG. 3 is a flow diagram of an example process for constructing a set of sub matrices of a feature co-occurrence matrix. For convenience, the example process is described as constructing a set of sub matrices of a feature co-occurrence matrix for a corpus of text. However, in some implementations the process 300 may be used to construct submatrices of feature co-occurrence matrices for other settings, e.g., videos or images. The process 300 will be described as being performed by a system of one or more computers located in one or more locations. For example, a system configured to perform feature embedding, e.g., the feature embedding system 100 including sub matrix construction module 110 of FIG. 1, appropriately programmed in accordance with this specification, can perform the process 300.

The system obtains a corpus of text (step 302). For example, the corpus of text may include a portion of the web, a portion of one or more books, or multiple search queries. In other examples the system may instead obtain a collection of videos, images or other features or metrics of interest.

The system computes an initial m×n feature co-occurrence matrix over the corpus of text (step 304). The initial feature co-occurrence matrix may include m row features and n column features.

As described above with reference to FIG. 2, the i-jth entry of an initial m×n feature co-occurrence matrix may represent an observed co-occurrence count of row feature i with column feature j. For example, if the m row features are words in a particular language and the n column features are strings of words, the entries of the m×n feature co-occurrence matrix may represent how many times the m words and n strings of words occur together in the corpus of text. As another example, in cases where the system obtains a collection of videos watched by online users instead of a corpus of text at step 302, the m row features may represent online videos and the n column features may represent online users. The entries of the m×n feature co-occurrence matrix may then represent how many times an online user watched a video.

The system sorts the m rows of the initial feature co-occurrence matrix into descending order of feature frequency (step 306). The system may then generate m/k row blocks by collecting the m sorted rows into k-element row blocks. In some implementations k is chosen based on the target dimensionality d of the row and column embedding vectors and a desired computational efficiency. For example, k may be set to maximize utilization of hardware that is used to generate the feature embeddings.

The system sorts the n columns of the initial feature co-occurrence matrix into descending order of feature frequency (step 308). The system may then generate n/k column blocks by collecting the n sorted columns into k-element row blocks.

In some implementations, the elements of the m/k row blocks may be generated by choosing rows that are congruent mod m/k. Similarly, the elements of the n/k column blocks may be generated by choosing columns that are congruent mod m/k. For example, if there are $2^{25}$ total rows in the initial m×n feature co-occurrence matrix, for k=4,096, every $2^{25}/4,096=8,192^{th}$ row may be selected to form a row block: the first row block containing rows (0, 8192, 16384 . . . ), the second row block containing rows (1, 8193, 16385 . . . ) and so on. In this manner, the system sorts the rows according to frequency. This construction may therefore result in each row block containing a mix of common and rare row features.

The system constructs a set of $mn/k^2$ sub matrices of the m×n feature co-occurrence matrix (step 310). The system constructs the set of $mn/k^2$ sub matrices by, for each row block and column block pair, constructing a k×k sub matrix from the m×n feature co-occurrence matrix by selecting appropriate, e.g., corresponding, entries of the generated m×n feature co-occurrence matrix.

Figure 4:
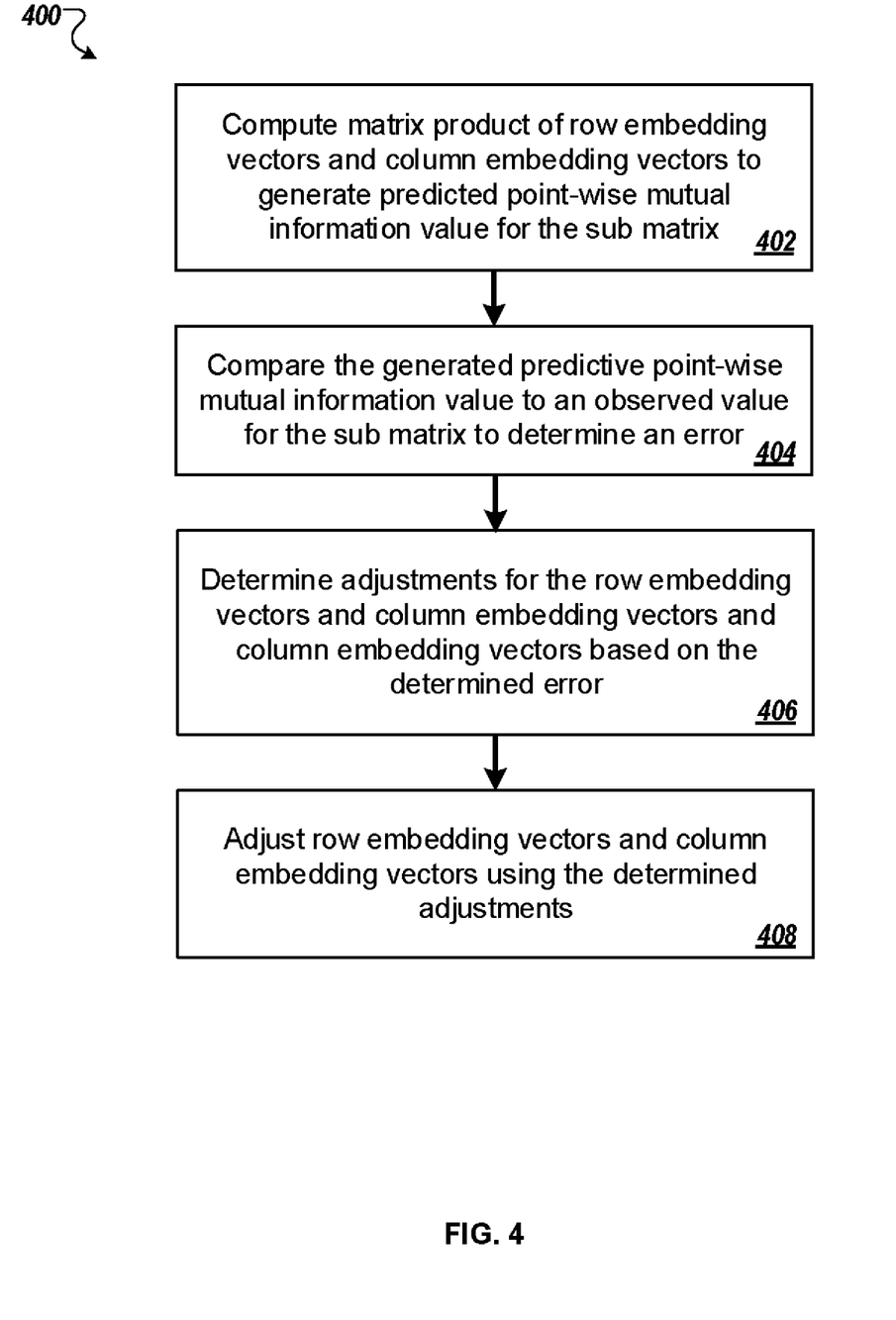
FIG. 4 is a flow diagram of an example iteration of adjusting a current set of row embedding vectors and a current set of subsequent column embedding vectors for a selected sub matrix using a feature co-occurrence matrix.

FIG. 4 is a flow diagram of an example iteration 400 of adjusting a current set of row embedding vectors and a current set of subsequent column embedding vectors for a selected sub matrix using a feature co-occurrence matrix. For example, the iteration 400 may be performed on an initial set of row embedding vectors and an initial set of column embedding vectors, as described above with reference to FIG. 2. For convenience, the process 400 will be described as being performed by a system of one or more computers located in one or more locations. For example, a system configured to perform feature embedding, e.g., the feature embedding system 100 of FIG. 1, appropriately programmed in accordance with this specification, can perform the process 400.

The system computes a matrix product of the current row embedding vectors from the particular row block and current column embedding vectors from the particular column block to generate a predicted point-wise mutual information (PMI) value for the selected sub matrix (step 402).

The system compares the generated predicted PMI value for the selected sub matrix to an observed PMI value for the selected sub matrix to determine an error (step 404). The observed PMI values may be calculated based on respective i-jth entries of the feature co-occurrence matrix and respective marginal counts of each row feature of the feature co-occurrence matrix, e.g., $x_{i*}=\Sigma_j x_{ij}$ where $x_{ij}$ represents each entry of the feature co-occurrence matrix, and marginal counts of each column feature of the feature co-occurrence matrix, e.g., $x_{*j}=\Sigma_i x_{ij}$ where $x_{ij}$ represents each entry of the feature co-occurrence matrix.

As described above with reference to step 304 of FIG. 3, in some implementations, each i-jth entry of the m×n feature co-occurrence matrix may take a value that is greater than or equal to zero. For example, the entry of the feature co-occurrence matrix may be zero if no occurrence is observed, or greater than zero if a co-occurrence is observed. In cases that the value of the i-jth entry of the initial m×n feature co-occurrence matrix is greater than zero, the system may compare the generated predicted PMI value for the selected sub matrix to an observed PMI value for the selected sub matrix to determine an error by computing a weighted squared error between the predicted PMI value and the observed PMI value of feature i and feature j.

The computed weighted squared error may be modulated by a confidence function, where the confidence function increases or decreases the computed error dependent on a confidence of the i-jth entry of the initial m×n feature co-occurrence matrix. In some implementations the confidence function is a linear transformation of the i-jth entry of the initial m×n feature co-occurrence matrix. Example confidence functions include, but are not limited to, $f(x_{ij})=\sqrt{x_{ij}}$ or $f(x_{ij})=\ln(x_{ij})$.

In cases that the value of the i-jth entry of the initial m×n feature co-occurrence matrix is equal to zero, the system may compare the generated predicted PMI value for the selected sub matrix to an observed PMI value for the selected sub matrix to determine an error by applying a soft hinge error, e.g., an anti-derivative of the sigmoid function, to the predicted PMI value. Applying a soft hinge error to the predicted PMI value prevents the system from over-estimating the PMI. For example, the system may compute a "hallucinated" PMI by setting the i-jth entry of the initial m×n feature co-occurrence matrix to 1 and using an asymmetric cost function that penalizes over-estimation of the hallucinated PMI. By considering cases where the value of the i-jth entry of the initial m×n feature co-occurrence matrix is equal to zero, the system uses information relating to unobserved occurrences. Such information can be important and improve the accuracy of the generated feature embeddings, e.g., when considering rarely occurring features. For example, in the case where the features include movies watched by a particular person, an unobserved occurrence between two movies may be used to indicate that the two movies are of different genres or styles.

The system determines adjustments for the current row embedding vectors from the particular row block and current column embedding vectors from the particular column block based on the determined error (step 406). In some implementations the system performs stochastic gradient descent to determine adjustments for the current row embedding vectors and current column vectors, e.g., by computing the gradient of an error function with respect to input embedding vectors.

The system adjusts the current row embedding vectors from the particular row block and current column embedding vectors from the particular column block using the determined adjustments to generate subsequent row embedding vectors and subsequent column embedding vectors (step 408). As described above with reference to FIG. 2, in some implementations, the system may iteratively adjust the initial and subsequent row embedding vectors and the initial and subsequent column embedding vectors using the feature co-occurrence matrix until a determined decrease between consecutively determined errors is below a predetermined threshold.

The methods and systems described in this specification can include or be used in conjunction with other systems, e.g., natural language processing systems, for generating and processing feature embeddings. For example, the system may obtain a corpus of text, e.g., a set of texts in the English language, and determine a corresponding feature vocabulary of words or strings of words ("phrases"). The feature vocabulary may be used to construct a feature co-occurrence matrix, which in turn may be parsed into sections and used to construct a corresponding set of sub matrices as described above. The constructed set of sub matrices may be used to generate word or phrase embeddings for the feature vocabulary. The generated word embeddings may be used or processed in a natural language processing system. For example, the word or phrase embeddings may be used to represent the corresponding words or phrases in a neural network system. As another example, the word or phrase embeddings may be used to represent features of the corresponding words in a machine learning model.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
 obtaining a set of sub matrices of a feature co-occurrence matrix, wherein each row of the feature co-occurrence matrix corresponds to a feature from a first feature vocabulary and each column of the feature co-occurrence matrix corresponds to a feature from a second feature vocabulary;
 selecting a sub matrix from the set of sub matrices, wherein the sub matrix is associated with a particular row block of the feature co-occurrence matrix and a particular column block of the feature co-occurrence matrix;
 assigning a respective d-dimensional initial row embedding vector to each of the features that correspond to the rows from the particular row block and a respective d-dimensional initial column embedding vector to each of the features that correspond to the columns from the particular column block, wherein d represents a predetermined target dimensionality; and
 determining a final row embedding vector for each of the features that correspond to rows from the particular row block and a final column embedding vector for each of the features that correspond to columns from the particular column block by iteratively adjusting the initial row embedding vectors from the particular row block and the initial column embedding vectors from the particular column block using the feature co-occurrence matrix, comprising, at each iteration:
 computing a matrix product of the row embedding vectors for the features corresponding to rows of the particular row block and the column embedding vectors for the features corresponding to columns of the particular column block to generate a respective predicted pointwise mutual information (PMI) value for each pair of features that includes (i) a feature corresponding to a row from the particular row block and (ii) a feature corresponding to a column from the particular column block;
 determining, from the feature co-occurrence matrix, an observed PMI value for each pair of features that includes (i) a feature corresponding to a row from the particular row block and (ii) a feature corresponding to a column from the particular column block;
 determining, for each pair of features that includes (i) a feature corresponding to a row from the particular row block and (ii) a feature corresponding to a column from the particular column block, an error between the observed PMI value for the pair and the predicted PMI value for the pair, and
 adjusting, for each pair of features that includes (i) a feature corresponding to a row from the particular row block and (ii) a feature corresponding to a column from the particular column block, the row embedding vector for the row in the pair and the column embedding vector for the column in the pair based on the error between the observed PMI value for the pair and the predicted PMI value for the pair.

2. The method of claim 1, further comprising:
 providing one or more of the final row embedding vectors or the final column embedding vectors as input to a natural language processing system for use in performing a natural language processing task.

3. The method of claim 1, further comprising:
 using the final row embedding vectors, the final column embedding vectors, or both in a natural language processing system in performing natural language processing tasks on received inputs.

4. The method of claim 1, wherein determining a final row embedding vector for each row from the particular row block and a final column embedding vector for each column from the particular column block by iteratively adjusting the initial row embedding vectors from the particular row block and the initial column embedding vectors from the particular column block using the feature co-occurrence matrix is performed in parallel for multiple sub matrices in the set of sub matrices.

5. The method of claim 1, wherein selecting a sub matrix from the set of sub matrices comprises selecting a sub matrix from the set of sub matrices at random.

6. The method of claim 1, wherein each d-dimensional initial row embedding vector and each d-dimensional initial column embedding vector have values that are distributed according to a normal distribution with zero mean and $d^{-1/2}$ variance.

7. The method of claim 1, wherein adjusting, for each pair of features that includes (i) a feature corresponding to a row from the particular row block and (ii) a feature corresponding to a column from the particular column block, the row embedding vector for the row in the pair and the column embedding vector for the column in the pair based on the error between the observed PMI value for the pair and the predicted PMI value for the pair comprises:
 determining adjustments for the row embedding vector for the row in the pair and the column embedding vector for the column in the pair based on the determined error for the pair; and
 adjusting the row embedding vector for the row in the pair and the column embedding vector for the column in the pair using the determined adjustments.

8. The method of claim 7, wherein determining adjustments for the row embedding vector for the row in the pair and the column embedding vector for the column in the pair comprises performing stochastic gradient descent.

9. The method of claim 7, wherein the observed PMI value is calculated based on a respective i-jth entry of the feature co-occurrence matrix corresponding to the pair and respective marginal counts of the row in the pair and the column in the pair.

10. The method of claim 1, wherein iteratively adjusting the row embedding vectors from the particular row block and the column embedding vectors from the particular column block using the co-occurrence matrix is performed until a determined decrease between consecutive determined errors is below a predetermined threshold.

11. The method of claim 1, further comprising constructing the set of sub matrices of the feature co-occurrence matrix, comprising:
 obtaining a corpus of text;
 computing an initial feature co-occurrence matrix over the corpus of text, wherein the initial feature co-occurrence matrix includes m row features and n column features;
 sorting the m rows into descending order of feature frequency and generating m/k row blocks by collecting the m sorted rows into k-element row blocks, wherein k is chosen based on the target dimensionality d and a desired computational efficiency;

sorting the n columns into descending order of feature frequency and generating n/k column blocks by collecting the n sorted columns into k-element row blocks; and constructing a set of mn sub matrices of the feature co-occurrence matrix, comprising, for each row block and column block pair, constructing a sub matrix from the feature co-occurrence matrix by selecting appropriate entries of the feature co-occurrence matrix.

12. The method of claim 1, wherein an i-jth entry of the feature co-occurrence matrix represents an observed co-occurrence count of row feature i with column feature j, and each i-jth entry of the initial feature co-occurrence matrix take a value that is greater than or equal to zero.

13. The method of claim 12, wherein when the value of an i-jth entry of the feature co-occurrence matrix corresponding to the pair is greater than zero, determining an error between the observed PMI value for the pair and the predicted PMI value for the pair comprises computing a weighted squared error between the predicted PMI value and the observed PMI value.

14. The method of claim 13, wherein the computed weighted squared error is modulated by a confidence function, wherein the confidence function increases or decreases the computed error dependent on a confidence of the i-jth entry of the feature co-occurrence matrix.

15. The method of claim 14, wherein the confidence function is a linear transformation of the i-jth entry of the feature co-occurrence matrix.

16. The method of claim 12, wherein when the i-jth entry corresponding to the pair of the feature co-occurrence matrix equals zero, determining the error comprises applying a soft hinge error to the predicted PMI value.

17. The method of claim 1, wherein the features from the first and second feature vocabulary comprise words or strings of words from a particular language.

18. The method of claim 17, wherein the first feature vocabulary is different to the second feature vocabulary that is used for the column features.

19. A system comprising one or more computers and one or more storage devices storing instructions that are operable, when executed by the one or more computers, to cause the one or more computers to perform operations comprising:

obtaining a set of sub matrices of a feature co-occurrence matrix, wherein each row of the feature co-occurrence matrix corresponds to a feature from a first feature vocabulary and each column of the feature co-occurrence matrix corresponds to a feature from a second feature vocabulary;

selecting a sub matrix from the set of sub matrices, wherein the sub matrix is associated with a particular row block of the feature co-occurrence matrix and a particular column block of the feature co-occurrence matrix;

assigning a respective d-dimensional initial row embedding vector to each of the features that correspond to the rows from the particular row block and a respective d-dimensional initial column embedding vector to each of the features that correspond to the columns from the particular column block, wherein d represents a predetermined target dimensionality; and determining a final row embedding vector for each of the features that correspond to rows from the particular row block and a final column embedding vector for each of the features that correspond to columns from the particular column block by iteratively adjusting the initial row embedding vectors from the particular row block and the initial column embedding vectors from the particular column block using the feature co-occurrence matrix, comprising, at each iteration:

computing a matrix product of the row embedding vectors for the features corresponding to rows of the particular row block and the column embedding vectors for the features corresponding to columns of the particular column block to generate a respective predicted point-wise mutual information (PMI) value for each pair of features that includes (i) a feature corresponding to a row from the particular row block and (ii) a feature corresponding to a column from the particular column block;

determining, from the feature co-occurrence matrix, an observed PMI value for each pair of features that includes (i) a feature corresponding to a row from the particular row block and (ii) a feature corresponding to a column from the particular column block;

determining, for each pair of features that includes (i) a feature corresponding to a row from the particular row block and (ii) a feature corresponding to a column from the particular column block, an error between the observed PMI value for the pair and the predicted PMI value for the pair; and adjusting, for each pair of features that includes (i) a feature corresponding to a row from the particular row block and (ii) a feature corresponding to a column from the particular column block, the row embedding vector for the row in the pair and the column embedding vector for the column in the pair based on the error between the observed PMI value for the pair and the predicted PMI value for the pair.

20. One or more non-transitory computer-readable storage media encoded with instructions that, when executed by one or more computers, cause the one or more computers to perform operations comprising:

obtaining a set of sub matrices of a feature co-occurrence matrix, wherein each row of the feature co-occurrence matrix corresponds to a feature from a first feature vocabulary and each column of the feature co-occurrence matrix corresponds to a feature from a second feature vocabulary;

selecting a sub matrix from the set of sub matrices, wherein the sub matrix is associated with a particular row block of the feature co-occurrence matrix and a particular column block of the feature co-occurrence matrix;

assigning a respective d-dimensional initial row embedding vector to each of the features that correspond to the rows from the particular row block and a respective d-dimensional initial column embedding vector to each of the features that correspond to the columns from the particular column block, wherein d represents a predetermined target dimensionality; and determining a final row embedding vector for each of the features that correspond to rows from the particular row block and a final column embedding vector for each of the features that correspond to columns from the particular column block by iteratively adjusting the initial row embedding vectors from the particular row block and the initial column embedding vectors from the particular column block using the feature co-occurrence matrix, comprising, at each iteration:

computing a matrix product of the row embedding vectors for the features corresponding to rows of the particular row block and the column embedding vectors for the features corresponding to columns of the particular column block to generate a respective predicted pointwise mutual information (PMI) value for each pair of features that includes (i) a feature corresponding to a row from the particular row block and (ii) a feature corresponding to a column from the particular column block;

determining, from the feature co-occurrence matrix, an observed PMI value for each pair of features that includes (i) a feature corresponding to a row from the particular row block and (ii) a feature corresponding to a column from the particular column block;

determining, for each pair of features that includes (i) a feature corresponding to a row from the particular row block and (ii) a feature corresponding to a column from the particular column block, an error between the observed PMI value for the pair and the predicted PMI value for the pair; and adjusting, for each pair of features that includes (i) a feature corresponding to a row from the particular row block and (ii) a feature corresponding to a column from the particular column block, the row embedding vector for the row in the pair and the column embedding vector for the column in the pair based on the error between the observed PMI value for the pair and the predicted PMI value for the pair.

* * * * *

UNITED STATES PATENT AND TRADEMARK OFFICE
CERTIFICATE OF CORRECTION

PATENT NO. : 10,685,012 B2
APPLICATION NO. : 15/424671
DATED : June 16, 2020
INVENTOR(S) : Shazeer et al.

Page 1 of 1

It is certified that error appears in the above-identified patent and that said Letters Patent is hereby corrected as shown below:

On the Title Page

The first or sole Notice should read --

Subject to any disclaimer, the term of this patent is extended or adjusted under 35 U.S.C. 154(b) by 658 days.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*